(12) United States Patent
Naghian

(10) Patent No.: US 7,907,934 B2
(45) Date of Patent: Mar. 15, 2011

(54) METHOD AND SYSTEM FOR PROVIDING SECURITY IN PROXIMITY AND AD-HOC NETWORKS

(75) Inventor: Siamak Naghian, Espoo (FI)

(73) Assignee: Nokia Corporation, Espoo (FI)

( * ) Notice: Subject to any disclaimer, the term of this patent is extended or adjusted under 35 U.S.C. 154(b) by 519 days.

(21) Appl. No.: 10/936,681

(22) Filed: Sep. 9, 2004

(65) Prior Publication Data
US 2005/0239438 A1 Oct. 27, 2005

(30) Foreign Application Priority Data
Apr. 27, 2004 (EP) .................................. 04009967

(51) Int. Cl.
*H04M 1/66* (2006.01)
(52) U.S. Cl. ........................... 455/410; 379/189; 726/36
(58) Field of Classification Search .................. 455/410, 455/435.1
See application file for complete search history.

(56) References Cited

U.S. PATENT DOCUMENTS

| | | | |
|---|---|---|---|
| 5,495,580 A * | 2/1996 | Osman ........................... 726/13 |
| 6,385,174 B1 * | 5/2002 | Li ................................. 370/252 |
| 6,745,027 B2 * | 6/2004 | Twitchell, Jr. ............. 455/422.1 |
| 6,859,831 B1 * | 2/2005 | Gelvin et al. ................. 709/224 |
| 6,967,941 B2 * | 11/2005 | Roy ............................... 370/338 |
| 6,983,146 B2 * | 1/2006 | Spratt ........................ 455/435.1 |
| 7,143,283 B1 * | 11/2006 | Chen et al. .................... 713/153 |
| 7,219,120 B2 * | 5/2007 | Hui ............................... 709/225 |
| 7,222,239 B2 * | 5/2007 | Smith .......................... 713/185 |
| 7,269,260 B2 * | 9/2007 | Adachi et al. ................ 380/270 |
| 7,283,904 B2 * | 10/2007 | Benjamin et al. ............. 701/117 |
| 7,301,926 B1 * | 11/2007 | Dietrich et al. ............... 370/338 |
| 2002/0032853 A1 * | 3/2002 | Preston et al. ................ 713/151 |
| 2002/0046287 A1 * | 4/2002 | La Porta et al. .............. 709/230 |
| 2002/0173296 A1 * | 11/2002 | Nordman et al. ............ 455/414 |
| 2003/0093689 A1 * | 5/2003 | Elzam et al. .................. 713/201 |
| 2003/0134598 A1 * | 7/2003 | Sendrowicz ................. 455/67.1 |
| 2003/0151513 A1 * | 8/2003 | Herrmann et al. ......... 340/573.1 |
| 2004/0103278 A1 * | 5/2004 | Abhishek et al. ............. 713/160 |
| 2004/0203797 A1 * | 10/2004 | Burr .............................. 455/445 |
| 2006/0089119 A1 * | 4/2006 | Lipasti et al. ................. 455/410 |

FOREIGN PATENT DOCUMENTS

| | | | |
|---|---|---|---|
| CA | 2 482 185 A1 | | 10/2003 |
| CA | 2482185 | * | 10/2003 |
| EP | 1 234 541 A | | 7/2003 |
| WO | WO 02/14989 A2 | | 2/2002 |
| WO | WO 03/084170 A | | 10/2003 |

* cited by examiner

*Primary Examiner* — Lester Kincaid
*Assistant Examiner* — Diego Herrera
(74) *Attorney, Agent, or Firm* — Mintz Levin Cohn Ferris Glovsky and Popeo, P.C.

(57) ABSTRACT

A method, system, and node provides security in a network such as a mobile proximity network and a mobile Ad-Hoc network. The security is provided by setting at least one of security parameters for a connection of a node to another node of the network. At least one context-awareness parameter is checked, and at least one of the security parameters is set depending on the result of the check of the at least one context-awareness parameter.

34 Claims, 6 Drawing Sheets

| SECURITY CLASSES | CONTEXT-AWARENESS CRITERIA | DESCRIPTION |
|---|---|---|
| CLASS I | TYPE OF CONTEXT | INDICATES WHAT KIND OF CONTEXT/APPLICATION IS IN QUESTION |
| CLASS II | SENDER/RECEIVER/USER GROUP | A GROUP OF FRIENDS, FAMILY MEMBERS, DEVICES, ETC. CAN BE DEFINED TO BE TREATED WITH A SPECIFIC SECURITY DEGREE |
| CLASS III | TIME-DEPENDENT CONTEXT | CERTAIN CONTENT(S) IS TREATED IN A CERTAIN WAY WITHIN A CERTAIN TIME. FOR INSTANCE, A PHONE CAN RECEIVE WEATHER INFORMATION IN PROXIMITY AND AD HOC WITHIN A CERTAIN PERIOD. |
| CLASS IV | COMMUNICATIONS MODE | INDICATES HOW THE CONTEXT IS TRANSMITTED E.G. BROADCASTING, MULTICASTING, GROUPCASTING, PEER-TO-PEER, ETC |
| CLASS V | LOCATION INFORMATION | A CERTAIN TYPE OF CONTEXT IS ALLOWED TO BE TRANSMITTED OR RECEIVED WITHIN AT LEAST ONE CERTAIN LOCATION. THIS CAN BE COMBINED WITH TIME ATTRIBUTES, AS WELL |

AN EXAMPLE OF CONTEXT AWARE SECURITY BASED ON CONTEXT CLASSIFICATION

AD-HOC NETWORK OF MOBILE NODES

| SECURITY CLASSES | CONTEXT-AWARENESS CRITERIA | DESCRIPTION |
|---|---|---|
| CLASS I | TYPE OF CONTEXT | INDICATES WHAT KIND OF CONTEXT/APPLICATION IS IN QUESTION |
| CLASS II | SENDER/RECEIVER/USER GROUP | A GROUP OF FRIENDS, FAMILY MEMBERS, DEVICES, ETC. CAN BE DEFINED TO BE TREATED WITH A SPECIFIC SECURITY DEGREE |
| CLASS III | TIME-DEPENDENT CONTEXT | CERTAIN CONTENT(S) IS TREATED IN A CERTAIN WAY WITHIN A CERTAIN TIME. FOR INSTANCE, A PHONE CAN RECEIVE WEATHER INFORMATION IN PROXIMITY AND AD HOC WITHIN A CERTAIN PERIOD. |
| CLASS IV | COMMUNICATIONS MODE | INDICATES HOW THE CONTEXT IS TRANSMITTED E.G. BROADCASTING, MULTICASTING, GROUPCASTING, PEER-TO-PEER, ETC |
| CLASS V | LOCATION INFORMATION | A CERTAIN TYPE OF CONTEXT IS ALLOWED TO BE TRANSMITTED OR RECEIVED WITHIN AT LEAST ONE CERTAIN LOCATION. THIS CAN BE COMBINED WITH TIME ATTRIBUTES, AS WELL |

FIG. 2

AN EXAMPLE OF CONTEXT AWARE SECURITY BASED ON CONTEXT CLASSIFICATION

METHOD AND SYSTEM FOR PROVIDING SECURITY IN PROXIMITY AND AD-HOC NETWORKS

FIELD AND BACKGROUND OF THE INVENTION

The present invention relates to a method and system of providing security in networks, in particular networks of temporary configuration such as proximity and Ad Hoc networks. The security ensures e.g. privacy in terms of access blocking, unblocking align with context-awareness as well as flexibility of security mechanism for wireless devices involved in proximity and Ad Hoc networks.

Proximity Networks, e.g. Wireless Networks, are network technologies which allow short range or low power, low cost communications packages to inter-communicate between mobile or fixed nodes. Proximity elements are typically connected together in an ad hoc communications structure. They may form a peer-to-peer wireless link, a set of single hop wireless link, or communication over multihop wireless connections. This way, they form a network of compatible wireless routers that set up a possibly short-lived network just for the communication needs of the moment, not necessarily with any assistance from a pre-existing infrastructure. Data may be relayed between elements until it is received by the addressed entity. No base stations or wired backbone networks are required for Proximity or Ad-Hoc networks. Data can be transmitted directly between the nodes (end-to-end communications) which also allows multihop communication. When integrated to other networks like cellular or the Internet the result is a hybrid network also known as semi-infrastructured ad-hoc or proximity network. In the hybrid architecture an overlay network assistance or local server may be provided to aid the local AdHoc networks. In terms of security, this means extending the security features of the overlay network and exploiting them in the AdHoc networks. Or, providing control, storage, algorithm, etc. function to the Ad-Hoc networks.

FIG. 8 shows a basic structure of such a customary Ad-Hoc network. Several different communication paths are shown which are established partly directly between the mobile terminals and partly using intermediate single or multi RANs, Radio Access Networks, or network servers. The RANs include base stations, BSs, which can communicate with gateways, GTWs, and wireless routers, WRs. The terminals may also directly communicate with each other via, or without, intermediate WRs. Control data flows are shown as dotted lines. User data flows are illustrated as full lines.

Security solutions generally treat security issues so as to assure integrity, confidentiality, and other security issues of the applications in an equal and flat manner.

SUMMARY OF THE INVENTION

It is an object of the present invention to provide a method and system for providing security for wireless networks, in particular, though not limited to, for proximity and ad-hoc networks.

This object is achieved by a method as defined in claim 1 or any one of the dependent method claims.

Additionally, the invention provides a system as defined in the independent system claim or any one of the dependent system claims.

Further, the invention provides a node as defined in the independent node claim or any one of the dependent node claims.

The present invention allows to ensure the security of proximity and Ad Hoc applications based on the context information. The invention hence improves the security aspects of wireless networks such as proximity or Ad-Hoc networks. The context and the required security degrees associated with the context can be defined in different ways and therefore variants of such categorization and associations also fall into the scope of this invention.

The claimed security solutions generally treat security issues taking into account the context or other characteristics of the applications.

BRIEF DESCRIPTION OF THE DRAWINGS

In the following, the present invention will be described in greater detail on the basis of embodiments with reference to the accompanying drawings.

FIG. 2 illustrates a table of context-aware security based on context classification.

DESCRIPTION OF EMBODIMENTS

Figure 1:
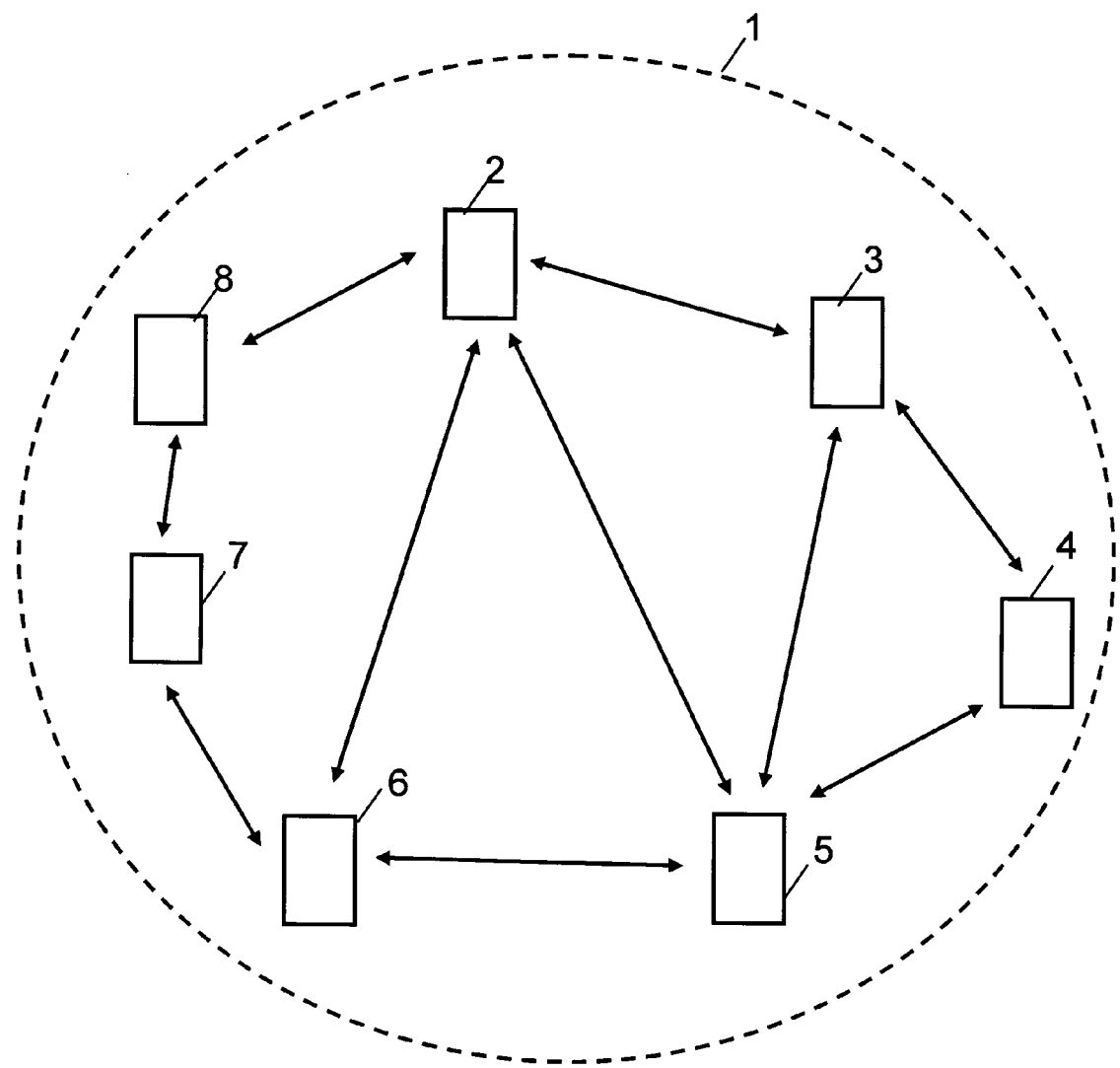
FIG. 1 shows an example of a wireless ad-hoc network formed of mobile nodes.

FIG. 1 shows an example of a wireless ad-hoc network 1 formed of nodes 2 to 8. The nodes 2 to 8 are able to communicate directly with at least one, some or all of the other nodes 2 to 8 without need of an intervening base station. The nodes 2 to 8 can be end-user devices, such as stationary or preferably mobile nodes like mobile phones, terminals, computers or other type of end-user devices, or they can be wireless routers forming a rooftop or fixed wireless network. The ad-hoc network 1 may be a proximity network to which the nodes 2 to 8 can register or deregister when approaching or moving away from at least one of the other nodes forming part of the network. The network 1 may also be a proximity network of more permanent structure wherein the nodes 2 to 8 remain stationary, or connectable or connected to the network 1, at least for some time, and can communicate with the other nodes for a longer time period than usual for ad-hoc networks.

Embodiments of the method and system in accordance with the invention tie the security aspects to the context and their dependencies so that the degree of needed security, the algorithm used for realizing the security and corresponding procedures become context-specific. This way context-awareness is provided. The degree of the security is preferably defined context-specifically. Therefore one or more of the following advantages or features can be achieved. The security of critical applications is guaranteed on a just-as-needed-basis. It is possible to avoid the generating of unnecessary overheads due to control signaling in association with contexts that are not critical and therefore do not require evoking heavy security procedures and algorithms. Rather, the capacity gain due to bypassing the security procedure may be used to improve other aspects of the Quality of Service, QoS, associated with the application (e.g. bit-rate, delay, etc). Therefore, the flexibility of using proximity and Ad Hoc applications is improved.

Context-awareness is of advantage in particular in case of proximity communications and Ad hoc networks such as Personal Area Networks (PAN) realized by utilizing short-range and cost effective radios like Wireless Local Area Networks (WLAN), Bluetooth (BT), and Ultra Wideband (UWB).

Context Awareness may for example include Situation Awareness such as awareness of at least one of the position or current location of the user, sender of the group to which the sender belongs to, the network element or server that originally generates the source data, trusted sources, characteristic of the environment like weather, temperature, time, orientation, activity, resources available, features of the user equipment, and communication partners of the user or network. Context Awareness may additionally or alternatively include personalization features such as preferences or abilities of the user, personal time schedule or profile and so on.

One basic example of a context-aware application is customizing information based on the current location. However, even if location is the most commonly used context data, there is much more to context than that as mentioned above.

According to the invention, one of the factors for local and proximity applications is the security and the way it is tied to the contexts of each group of applications. The collecting or checking of context related information, for providing the context-awareness, includes collecting or checking context information merely from the terminal and its accessories, or collecting or checking the context information from the terminal plus proximity context, or, eventually, checking distributed context-aware applications. In this regard, the privacy and access block covers functionality to ensure the confidentiality of the context information, to enable access control to information and services, and to guarantee the integrity of the service functionality.

According to one of the implementations of the invention, a number of security classes are defined in accordance with different criterias based on the context of services. Different security actions are taken for each class. An advantage is that the security becomes flexible and efficient for different applications. Unnecessary security actions can be avoided. This saves capacity of the node and network and reduces overall load.

Traditional security approaches with flat/equal treatment do not meet the limitations and requirements of proximity ad hoc networks. In such environment, the type and nature of applications are very diverse and the security demands are various. So Context-aware security is advantageous.

Most of proximity and local Ad Hoc applications may involve personal entertainment (e.g. gaming, chatting, etc.) or data sharing. There is an increased risk of becoming a target of attacks because the nature of the network/connection formation is more and more pervasive. This also leads to a situation that the type and nature of applications are very diverse, ranging from low-security (non-security) demanding to highly security-stringent applications. The invention provides a solution to such a situation and implements a multi-disciplinary security approach.

Even when assuring stringent security requirements of proximity and Ad Hoc applications, many potential and useful applications can be used without limitations or difficulties in the interaction with their sources (peer nodes, servers, etc.). The security approach according to the invention is able to ensure the flexibility of the applications context-specifically.

Therefore, the context-aware security according to the invention allows security handling in proximity and local Ad Hoc and peer-to-peer environments.

The degree of security to be fulfilled by the system or nodes can be provided on a need-basis, depending on the nature of the applications. Alternatively, the security degree can be predefined based on the context of the requested services.

Bypassing unnecessary security actions saves the node's/network's capacity recourse by decreasing the signaling and processing load needed to run the security procedures and algorithms.

Sophisticated security procedures are focused efficiently on the application and services that require high security.

Pervasive services can easily be provided by easing the connection delay in association with the services that do not require stringent security support. Alternatively, context-awareness helps to provide the essential information based on which a pre-defined action can be taken to ease the security process specially in conjunction with access blocking and block removing process.

As mentioned above, one of the ideas of the proposed context-aware security is to ensure the security (accessibility, integrity, confidentiality, etc.) of proximity and/or Ad Hoc applications based on the context information.

At the same time, the invention is pursuing to ensure the flexibility of proximity applications by removing unnecessary security barriers by utilizing context and defining the security requirements/degrees, accordingly.

There are different ways to define the context and the required security degrees to be handled in association with.

FIG. 2 shows a table which describes an example of an embodiment of the invention in which a number of security classes are defined beforehand or in conjunction with a service discovery process. The left column of the table of FIG. 2 lists security classes, the middle column context-aware criteria, and the right column includes description of the offered security in connection with the context.

These parameters can be set by source nodes, destination nodes, or with the help of their cooperation. It is also possible to assist the process by using overlay networks and local servers in a semi-infrastructured Ad Hoc network or in proximity and local area networks. If so, the overlay networks or servers can help handling the context information and associated security attributes.

The parameters can also be predefined by using the device user interface or in association with the services/bearer classification fulfilled in the assistant network or server. The key criteria of each security class are based on the context of the services. Once they have been defined the security action can be defined accordingly and the needed security actions are taken (or remain untaken) when the service is offered.

According to other embodiments of the invention, it may also be useful to tie the context-awareness with the security requirement categories, being as; confidentiality, integrity, availability, authenticity, accountability, and non-repudiation.

From those, the first three security requirements are the well-established classical requirements that have been widely accepted for several decades while the later requirements have emerged recently.

Authenticity and Non-repudiation have emerged with the networks while accountability has become an important issue with commercial software production, usage, and applications.

Confidentiality means that only the intended receiver can access the information that is transmitted. This is the classical secrecy (or privacy) requirement and lot of work has been put in to solving it, resulting in for example many different cryptographic algorithms.

Integrity demands that everything is as it should be and that nothing should change. That is, the data received should be exactly the data sent, no accidental or malicious changes should be able to occur on the way, and if they occur they should be detected.

Availability assures that a service should be accessible for an authorized user at any time and without undue delay.

Authenticity means that everyone can be proved (or disproved) to be the one they pretend.

Accountability is another is pretty new requirement since it does not concern the prevention acts but on the way the security consequences could be traced. Therefore, it is very close to, or should be built on top of, authenticity.

Non-repudiation means that a receiver or a sender should not later be able to deny sending or receiving some message. Thus, it requires both integrity and authentication to be implemented.

Alternative classifications are also possible and therefore the scope of the invention is not limited to the examples described herein.

It is also possible to fulfill the context-aware security without having the classifications but just with using signaling connection and preliminary information exchanging between communicating peers.

In the following, FIG. 2 will be described in more detail which shows an example of context aware security based on the context classification in accordance with an embodiment of the invention.

According to the second row of the table of FIG. 2, a security class, Security Class I in this embodiment, can be selected depending on the type of context. The type of context indicates what kind of context/application is in question. For example, a set of games can be defined so as to be treated similarly from the security point of view (e.g. not allowed, no sophisticated security is needed, allowed if the counterpart has already allowed the user to use/share the same context i.e. incentive-based proximity data sharing, etc).

According to the third row of the table of FIG. 2, a security class, Security Class II in this embodiment, can be selected depending on the actual Sender/receiver/user group. The Sender/receiver/user group indicates a group e.g. of friends, family members, devices, etc. (trusted, non-plausible, malicious, etc.) that can be defined to be treated with a specific security degree e.g. having access to more critical proximity data to which the original device can provide or share.

According to the fourth row of the table of FIG. 2, a security class, Security Class III in this embodiment, can be selected depending on time-dependent context. The time-dependent context refers to content(s) that is treated in a certain way within a certain time. For instance, the phone of the user can receive weather information in proximity and Ad Hoc within a certain period. Within that time period other proximity information is discarded or treated toughly by the security agent. This can be combined with location information, as well.

According to the fifth row of the table of FIG. 2, a security class, Security Class IV in this embodiment, can be selected depending on a communications mode. The communications mode indicates how the context is transmitted e.g. by broadcasting, multicasting, groupcasting, peer-to-peer, etc. For example, no broadcasted context is allowed to be received. Or, in case of broadcasting the integrity checking part of security procedure could be bypassed.

According to the sixth row of the table of FIG. 2, a security class, Security Class V in this embodiment, can be selected depending on location information. The Location information indicates that a certain type of context is allowed to be transmitted or received within one or more certain locations. This can be combined with time attributes, as well. For example, when the user is at his/her workplace (e.g. from 9:00 to 17:00) his/her group related context is accepted to be transmitted/received in any communication forms but advertisement receiving is blocked.

There are several ways to implement the invention. As an example, each user may define a set of applications to be accepted/supported by her/him and security degrees to be used, accordingly. According to another approach, the security classes and the related security procedures may be configured to the system/devices. Another alternative consists in establishing a signaling connection between the overlay network(s) and Ad Hoc nodes for context information delivery when a node starts interacting with its peer. This means that the context vs. security criteria mapping is fulfilled by the network and the results are sent to the wireless device via the control signaling. Once, the device receives the control information it adjusts/uses the security action, accordingly. Certain parts of the process are supported by the overlay network. The above designs or configurations may also be used in arbitrary combination.

The proximity applications may be realized with appropriate technologies like Bluetooth, Wireless LAN, Ultra Wideband, etc. The security arrangement according to the invention may be implemented as a basic function of the end user devices such as mobile phones, laptops, PDA, etc, supporting short-range radios (e.g. Bluetooth, Wireless LAN, Ultra Wideband).

In the following a method according to an embodiment of the present invention will be described on the basis of FIG. 3.

Figure 3:
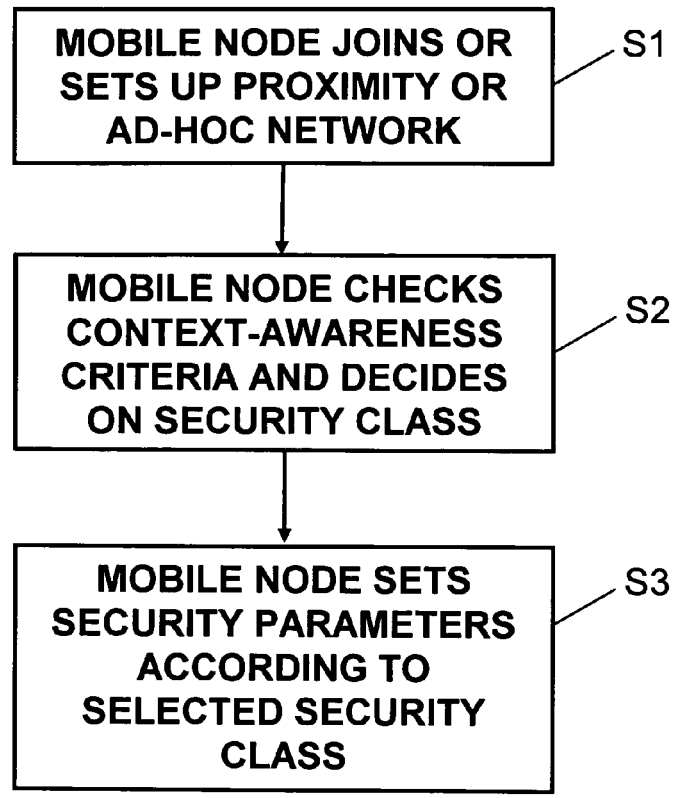
FIG. 3 shows an embodiment of a method for setting up security based on context-awareness in accordance with the present invention.

As shown in FIG. 3, in a step S1, a node, such as one of the mobile nodes 2 to 8 of FIG. 1, joins, or sets up, a proximity or ad-hoc network by registering to the network.

In a step S2, the mobile node checks context-awareness criteria by checking its location, the time, the application involved etc, and decides on security class applicable to the detected context-awareness criteria. The node may include an internal memory, or have access to an external memory, which stores information, such as the list of FIG. 2, which defines the relation between the detected context-awareness criteria and the security class, or security parameters, to be applied to the detected context-awareness criteria.

In a step S3, the mobile node sets the security parameters according to selected security class.

Figure 4:
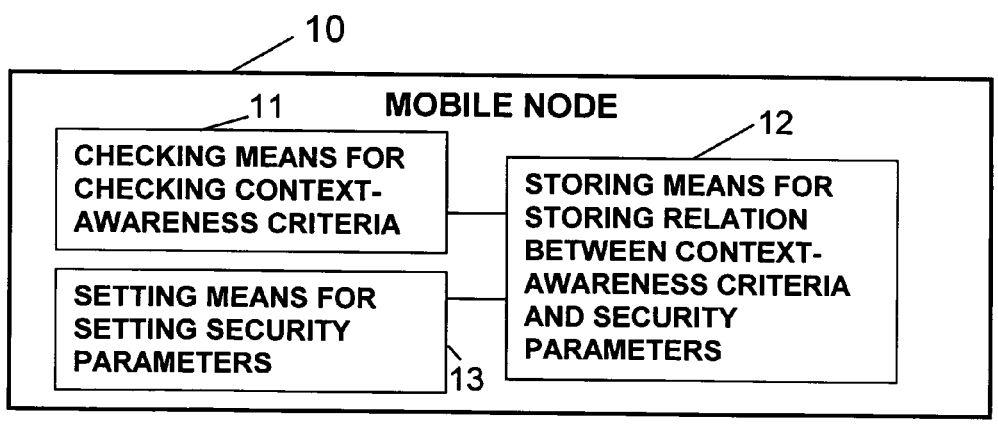
FIG. 4 shows an embodiment of a mobile node adapted for setting up security based on context-awareness in accordance with the present invention.

FIG. 4 shows an embodiment of a mobile node 10 to be used in a system or method as described above. The node 10 is adapted for setting up security based on context-awareness in accordance with the present invention. The node 10 is further adapted for participating in a proximity network or ad-hoc network and enables direct communication with other terminals without an intervening base station. The node 10 includes checking means 11 adapted to check context-awareness criteria, storing means 12 adapted to store relation between context-awareness criteria and security parameters such as the table shown in FIG. 2, and setting means 13 adapted to set the security parameters for the connection to other mobile nodes of the network. The means 11 to 13 are interconnected such as shown in FIG. 4 so as to enable carrying out e.g. the method of FIG. 3.

Figure 5:
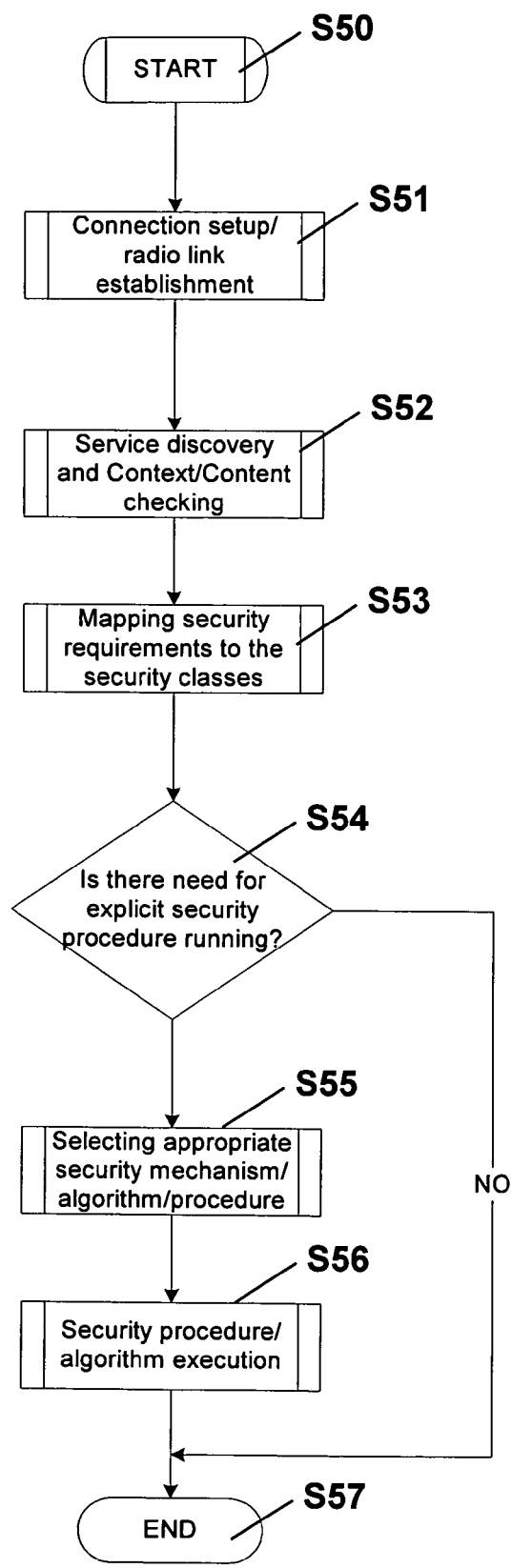
FIG. 5 shows an example of context-aware security method in accordance with an embodiment of the invention.

FIG. 5 shows an example of context-aware security method as applied in an embodiment of the invention. After start in step S50, a step S51 of connection setup/radio link establishment is carried out. Then, in step S52 service discovery and checking of at least one of Context and Content is performed. Thereupon, in step S53 security requirements assigned to the service and/or context or content detected in the preceding discovery steps are mapped to the security classes. The method then decides, in step S54, on whether there is a need for running an explicit security procedure. If yes, an appropriate security mechanism and/or security algorithm and/or security procedure is selected, step S55, and the selected mechanism/algorithm or procedure is executed in step S56. Thereupon, the routine ends, step S57. When the step S54 of deciding on whether there is a need for running an explicit security procedure, yields the answer no, the routine jumps to the end step S57.

Figure 6:
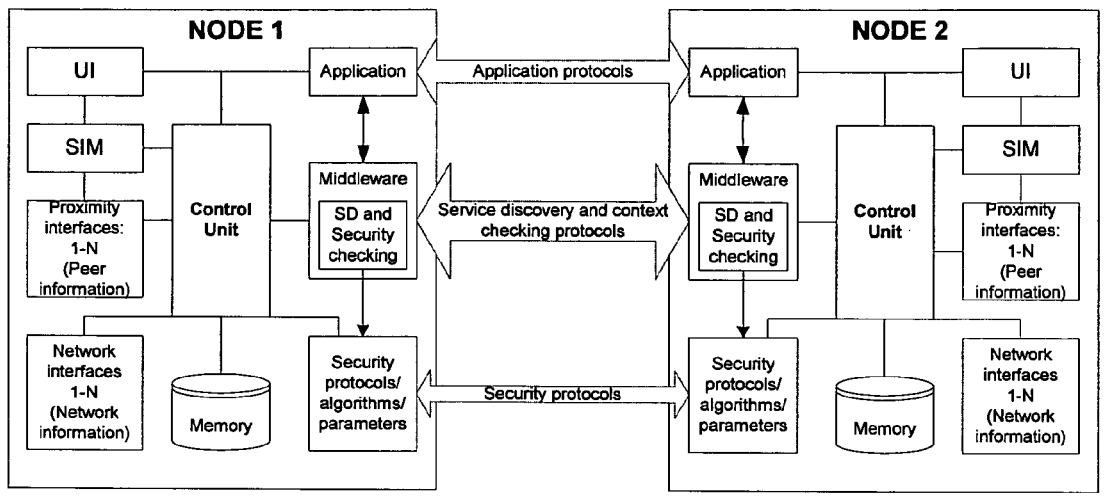
FIG. 6 illustrates a schematic example of nodes such as mobile phones, mobile devices, portable devices like laptop, etc., showing the basic architecture of devices or parts of embodiments of the invention.

FIG. 6 shows a schematic example of nodes Node 1 and Node 2 which may be implemented as mobile phones, mobile devices, portable devices like laptop, etc. FIG. 6 illustrates the basic architecture of devices and means referred in embodiments of the invention. A User Interface UI allows end-user to start its request, enter parameter options and select functional options supported by the device. A Subscriber Identity Module (SIM) which may also be a Universal SIM (USIM) allows the end user to establish a connection to the infrastructure such as cellular networks. This way, the device will be able to access the network infrastructure for establishing a connection to the Home Location Register, HLR (i.e. the Authentication Center, AuC). When SIM is used as a security basis for establishing the security transactions within the proximity Ad-Hoc networks, a protocol conversion between the protocol used within the ad-hoc network and the protocol used between the gateway node and the radio access network is provided.

The core of the node Node1, Node2 is a control unit, which is connected to various interfaces of the node. The interfaces can be divided into two classes: interfaces for proximity and ad-hoc networks, and interfaces for the network infrastructure. The ad-hoc interfaces include one or more interfaces, each offering the functionality needed to accomplish connectivity to an ad-hoc network of a particular type. Several ad-hoc interfaces are necessary, at least whenever the node serves ad-hoc networks based on different technologies. For example, one ad-hoc network served may be based on WLAN technology, while another one may be based on Bluetooth technology.

The interfaces to the supporting infrastructure also include one or more interfaces, each offering the functionality needed to accomplish connectivity to a system (i.e. network infrastructure) of a particular type. For example, interfaces may offer connectivity to a GSM or UMTS network, while other interfaces offers connectivity to a WLAN network.

The node further includes a card reader into which a (U)SIM card can be inserted, and a memory unit Memory. The card reader and the memory unit are connected to the control unit in order that the control unit is able to read data from the (U)SIM and from the memory unit and write data into the (U)SIM and into the memory unit. In addition, the node includes user interface means for using the node. The user interface means typically include a display and a keypad. The structure of the trunk node may also be modular so that it comprises a stand-alone ad-hoc module separate from a module containing the infrastructure interface. The ad-hoc module of the node may then utilize the SIM of the infrastructure interface over a short-range radio connection, such as a Bluetooth connection.

The memory unit Memory includes a secured memory area storing information about security aspects of the set of ad-hoc nodes to which the node has had proximity communication or will likely have it in the future. This information may also include the transaction features (type, parameters, algorithms, reputation history, etc.) used in associated with those defined nodes. For each IMSI received from the ad-hoc nodes, this memory area may include, for example, the following information: the authentication data related to the node, the ad-hoc level identities of the node, the IPSec keys used by the node, the distance to the node measured as the number of hops between the node and the trunk node, etc. The ad-hoc identities may include the layer 2 and 3 addresses of the ad-hoc nodes, for example. The layer 3 address may be the global IPv6 address of the node, while the layer 2 address may be a Medium Access Control (MAC) address, for example. The authentication data includes the parameters calculated in the node and received from the AuC and from the node.

The node may also provide context-aware security services to ad-hoc nodes without a (U)SIM. With respect to such an ad-hoc node, the node assumes the role of a certification entity, i.e. the role of a trusted third party providing security key management. The network infrastructure assists the trusted node in generating the security actions based on the (U)SIM of the node. For example, the node can generate information about fair nodes, reputation history, a pair of public and private keys in the above-described manner. The node may then distribute this information to desired ad-hoc nodes to be used by these nodes.

As shown in FIG. 6, each node may have different protocols that are used when communicating with the vicinity nodes. Application layer allows the end user to obtain access via the user interface, UI, to the services supported by the device and subscribed by the SIM. Once an application is requested or triggered the Service Discovery protocols indicate to the security checking entity to define the security requirements of the requested services. This includes the process defined in the main algorithm of the invention and based on the security classes defined therein. It also selects the means and criteria to be used by the peers. That includes the criteria, how the security association is going to be exchanged and agreed, what would be the lifetime of the security association, etc. Once these have been done, the security protocols are initiated and the algorithms are executed. The results of these actions are stored in the database/memory of the node or when applicable in the network for the latter use e.g. for reputation and context evaluation used for the proximity security purposes.

Figure 7:
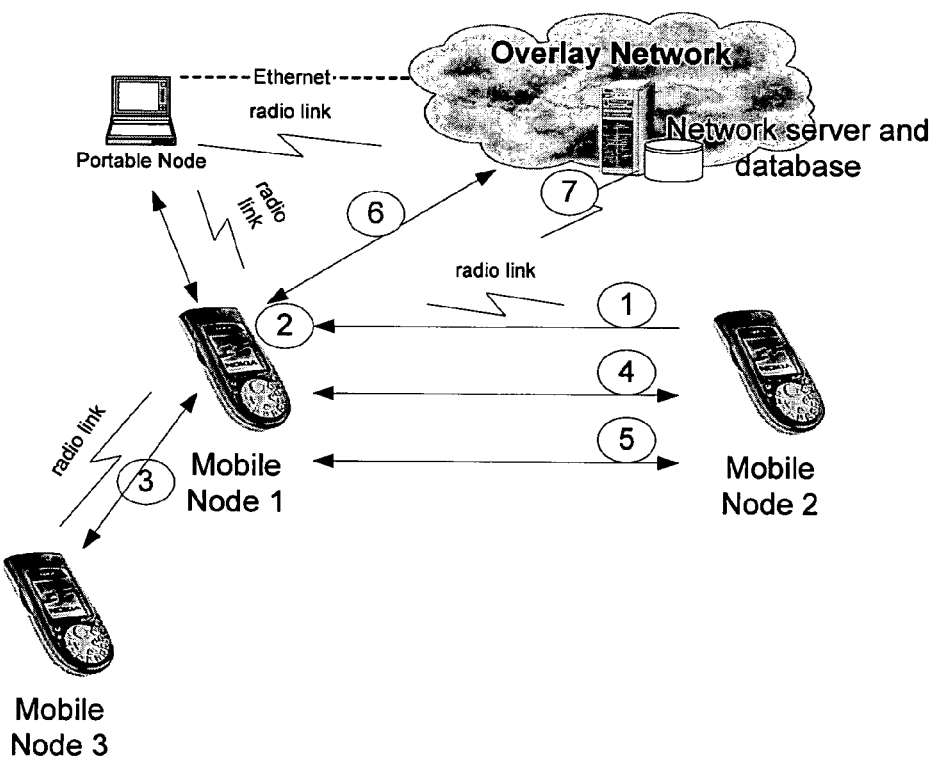
FIG. 7 shows an example of an use case of an embodiment of the invention.
Figure 8:
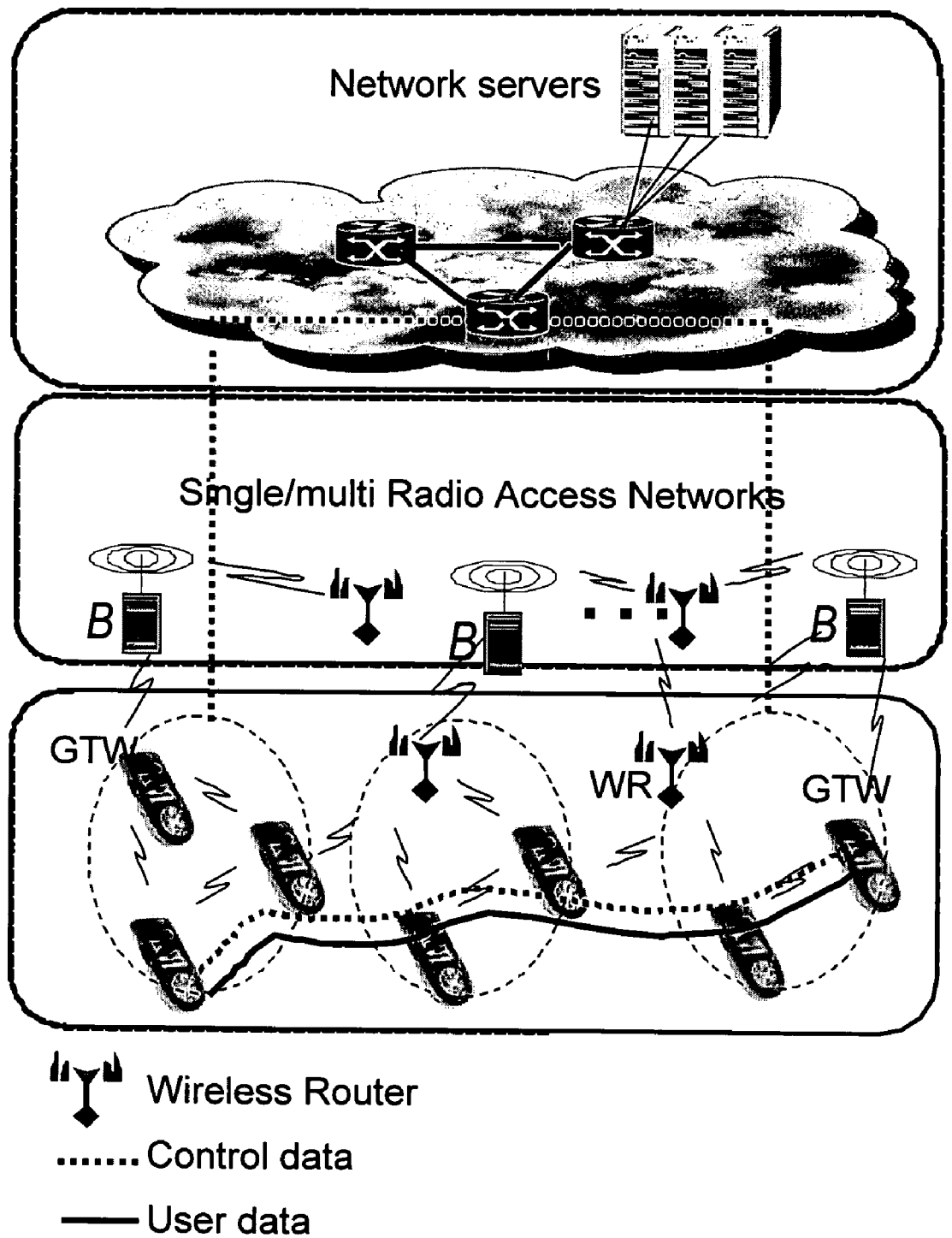
FIG. 8 shows a basic structure of a customary Ad-Hoc network.

In FIG. 7, an embodiment of an use application of the invention is illustrated. In Step 1, a Mobile Node 2 requests a service from its neighbor node (Mobile Node 1) via a direct radio link. The requested service can for example be a messaging service, e-mail, file transferring, service sharing, voice, video, payment, cash exchanging, etc. In Step 2, the Mobile Node 1 looks up the security needs based on the context of the requested services from Node 2. Node 1 also may check the history data related to the originated node Node 2 based on the information it has in its memory (reputation history) or by requesting assistance from the overlay network or local servers in the proximity e.g. in shop centers, banks, public places like bus and train stations, etc.

In a Step 3, the Node 1 may also use the mobile proximity nodes or their information for judging on the fairness of the originated node 1. For example, Node 1 may detect that Node 3 allows Node 2 to provide services (such as user services, database access, storage services, wireless communication, etc.) to a certain extent and for specific services defined based on the context of the services. For example a user can allow his friend to have/allow others to access to the user's web page, hobby database, etc. A certain numbers of proximity network (group) can update the shared database, message box, newsgroup, etc. and give wireless access to others to whom they trust.

In Step 4, based on the results of the security actions taken by Node 1 it starts negotiation with the originated node (Node 2) about establishing the security transaction.

In Step 5, the security transaction is executed and the results of the transaction are updated to the databases in Node 1, Node 2, Node 3, and possibly is communicated with the overlay network in which the database is updated (Step 6).

In Step 7, the overlay network or the local proximity servers provide the security history about the fair and unfair nodes when necessary or requested. This can be done in association with new connections or be multicasted/broadcasted to certain nodes subscribed for example to a group networking service.

The above description of the preferred embodiment and the accompanying drawings are only intended to illustrate the present invention. The preferred embodiment of the invention may vary within the scope of the attached claims.

The invention claimed is:

1. A method comprising:
   providing, by a node or a network device, security in a network which comprises at least one node;
   checking a plurality of context-awareness parameters, the plurality of context-awareness parameters comprising at least one of a type of context parameter, a sender/receiver/user group parameter, a time-dependent context parameter, a communications mode parameter, and a location information parameter,
   setting at least one of a plurality of security parameters for a connection of a node to another node of the network depending on a result of the check of the plurality of context-awareness parameters, the setting of the at least one of the plurality of security parameters being based on a combination of context-awareness parameters that includes at least one of: a type of application executing on the node or the network device, a sender/receiver/user group, time information and communication mode used by the node or network device;
   representing context by the plurality of context-awareness parameters;
   obtaining a mapping between the context and the at least one security parameter; and
   establishing the connection between the node and the other node via a direct radio link, the node and the other node forming part of an ad-hoc network;
   wherein, when the other node receives a request for service from the node, the other node checks required security based on a context of the service, starts negotiating with the node about establishing the required security, and provides the service to the node after establishment of the required security.

2. A method according to claim 1, wherein the at least one node comprises a mobile node.

3. A method according to claim 1, wherein the network comprises at least one of a mobile proximity network and a mobile ad hoc network.

4. A method according to claim 1, further comprising:
   providing a number of security classes, each security class thereof having security provisions, wherein the result of the check of the at least one context-awareness parameter indicates one of the security classes.

5. A method according to claim 1, wherein the at least one context-awareness parameter comprises at least one of type of context, actual sender/receiver/user group, time-dependent context, location information, and communications mode.

6. A method according to claim 1, further comprising:
   defining the plurality of security parameters with at least one of accessibility, integrity, and confidentiality of proximity and ad hoc applications.

7. A method according to claim 1, further comprising:
   setting the at least one context-awareness parameter by a user which defines a set of applications to be accepted or supported by said user and security degrees to be used for the set of applications.

8. A method according to claim 1, further comprising:
   configuring security classes and related security procedures to a system and/or to the at least one node.

9. A method according to claim 1, further comprising:
   establishing a signaling connection between an overlay network and the node, wherein said signaling connection is used for delivery of context information to the node when the node starts interacting with the overlay network.

10. A method according to claim 1, further comprising
    checking, with the other node, history data related to the originating one node, and
    deciding on providing or not providing the requested service dependent on the history data.

11. A method according to claim 1, wherein the mapping is performed by the network and obtained therefrom.

12. An apparatus comprising:
    a processor configured to check a plurality of context-awareness parameters, the plurality of context-awareness parameters comprising at least one of a type of context parameter, a sender/receiver/user group parameter, a time-dependent context parameter, a communications mode parameter, and a location information parameter;
    the processor also configured to set at least one of plurality of security parameters for a connection of a node to another node of a network depending on a result of the check of the plurality of context-awareness parameters, and to represent context by the plurality of context-awareness parameters;
    the processor further configured to obtain a mapping between the context and the at least one security parameter;
    an establisher configured to establish a connection to the other node via a direct radio link;
    a checker configured to check a required security based on a context of a service, upon receiving a request for service from the apparatus;
    a negotiator configured to start negotiating with the other node about establishing the required security; and
    a provider configured to provide the service to the other node after establishment of the required security;
    wherein setting the at least one of the plurality of security parameters is based on a combination of context-awareness parameters that includes at least one of: a type of application executing on the node or the network device, a sender/receiver/user group, time information and communication mode used by the node or network device.

13. An apparatus according to claim 12, wherein the apparatus comprises a mobile node.

14. An apparatus according to claim 12, wherein the apparatus further comprises:

a user interface configured to allow a user to start a request, enter parameter options or select functional options supported by the apparatus.

15. An apparatus according to claim 12, further comprising:
a subscriber identifier configured to be used as a security basis for establishing security transactions within a mobile network.

16. An apparatus according to claim 12, further comprising:
a controller, which is connected to interfaces of the apparatus, wherein the interfaces comprise interfaces for proximity and ad-hoc networks, and interfaces for network infrastructure.

17. An apparatus according to claim 16, further comprising:
a card reader configured to receive a card; and
a memory,
where the card reader and the memory are connected to the controller so that the controller is able to read and write data from or into the card and from or into the memory.

18. An apparatus according to claim 17, wherein the memory comprises a secured memory area configured to store information about security aspects of nodes of a mobile network, the secured memory area comprising at least one of the following information
authentication data related to a node,
ad-hoc level identities of the node,
security keys used by the node, and
a distance to the node measured as a number of hops between the node and a trunk node.

19. An apparatus according to claim 12, further comprising:
a history checker configured to check history data related to the other node; and
a decider configured to decide on providing or not providing the service depending on the history data.

20. An apparatus according to claim 12, wherein the mapping is performed by the network and obtained therefrom.

21. An apparatus comprising:
a controller configured to provide security in a network which comprises at least one node;
a processor configured to check a plurality of context-awareness parameters, the plurality of context-awareness parameters comprising at least one of a type of context parameter, a sender/receiver/user group parameter, a time-dependent context parameter, a communications mode parameter, and a location information parameter,
the processor further configured to set at least one of a plurality of security parameters for a connection of a node to another node of the network depending on a result of the check of the plurality of context-awareness parameters and to represent context by the plurality of context-awareness parameters;
the processor is further configured to obtain a mapping between the context and the at least one security parameter; and
an establisher configured to establish the connection between the node and the other node via a direct radio link, the node and the other node forming part of an ad-hoc network;
wherein, when the other node receives a request for service from the node, the other node checks required security based on a context of the service, starts negotiating with the node about establishing the required security, and provides the service to the node after establishment of the required security;
and wherein setting of the at least one of the plurality of security parameters is based on a combination of context-awareness parameters that includes at least one of: a type of application executing on the node or the network device, a sender/receiver/user group, time information and communication mode used by the node or network device.

22. An apparatus according to claim 21, wherein the at least one node comprises a mobile node.

23. An apparatus according to claim 21, wherein the network comprises at least one of a mobile proximity network and a mobile ad hoc network.

24. An apparatus according to claim 21, wherein the at least one context-awareness parameter comprises at least one of type of context, actual sender/receiver/user group, time-dependent context, location information, and communications mode.

25. An apparatus according to claim 21, further comprising a definer configured to define the plurality of security parameters with at least one of accessibility, integrity, and confidentiality of proximity and ad hoc applications.

26. An apparatus according to claim 21, wherein the parameter setter is configured to set the at least one context-awareness parameter by a user which defines a set of applications to be accepted or supported by said user and security degrees to be used for the set of applications.

27. An apparatus according to claim 21, further comprising a processor configured to configure security classes and related security procedures to the system and/or to the at least one node.

28. An apparatus according to claim 21, wherein the mapping is performed by the network and obtained therefrom.

29. A method comprising:
checking, by a node or network device, a plurality of context-awareness parameters, the plurality of context-awareness parameters comprising a type of context parameter, a sender/receiver/user group parameter, a time-dependent context parameter, a communications mode parameter, and a location information parameter;
setting at least one of a plurality of security parameters for a connection of a node to another node of a network depending on a result of the check of the plurality of context-awareness parameters, the setting of the at least one of the plurality of security parameters being based on a combination of context-awareness parameters that includes at least one of: a type of application executing on the node or the network device, a sender/receiver/user group, time information and communication mode used by the node or network device;
representing context by the plurality of context-awareness parameters;
obtaining a mapping between the context and the at least one security parameter; and
establishing the connection between the node and the other node via a direct radio link, the node and the other node forming part of an ad-hoc network;
wherein, when the other node receives a request for service from the node, the other node checks required security based on a context of the service, starts negotiating with the node about establishing the required security, and provides the service to the node after establishment of the required security.

30. A method according to claim 29, wherein the node comprises a mobile node.

31. A method according to claim 29, further comprising: allowing a user to start a request, enter parameter options, or select functional options supported by the node.

32. A method according to claim 29, further comprising: establishing security transactions within a mobile network.

33. A method according to claim 29, further comprising: checking history data related to the other node; and deciding whether to provide the service, depending on the history data.

34. A method according to claim 29, wherein is performed by the network and obtained therefrom.

* * * * *

UNITED STATES PATENT AND TRADEMARK OFFICE
CERTIFICATE OF CORRECTION

| | | |
|---|---|---|
| PATENT NO. | : 7,907,934 B2 | Page 1 of 1 |
| APPLICATION NO. | : 10/936681 | |
| DATED | : March 15, 2011 | |
| INVENTOR(S) | : Naghian | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this
Fifth Day of July, 2011

David J. Kappos
*Director of the United States Patent and Trademark Office*